United States Patent [19]

Vogt et al.

[11] 4,344,527

[45] * Aug. 17, 1982

[54] ROLLER CONVEYOR WITH FRICTION ROLL DRIVE

[75] Inventors: Robert K. Vogt; Martin A. Heit, both of Cincinnati, Ohio

[73] Assignee: The E. W. Buschman Company, Cincinnati, Ohio

[*] Notice: The portion of the term of this patent subsequent to Aug. 22, 1995, has been disclaimed.

[21] Appl. No.: 284,760

[22] Filed: Jul. 22, 1981

Related U.S. Application Data

[63] Continuation of Ser. No. 914,851, Jun. 12, 1978, which is a continuation-in-part of Ser. No. 710,442, Aug. 2, 1976, Pat. No. 4,108,303.

[51] Int. Cl.$^3$ .............................................. B65G 13/06
[52] U.S. Cl. ..................................... 198/781; 198/789
[58] Field of Search .............. 198/781, 789, 790, 791; 192/38; 474/111, 113, 140

[56] References Cited

U.S. PATENT DOCUMENTS

| | | | |
|---|---|---|---|
| 2,769,515 | 11/1956 | Thomas et al. | 193/35 A |
| 3,225,893 | 12/1965 | Currie | 198/781 |
| 3,612,248 | 10/1971 | Wallis | 198/781 |
| 3,718,248 | 2/1973 | Muller | 198/781 |
| 4,108,303 | 8/1978 | Vogt et al. | 198/781 |
| 4,121,709 | 10/1978 | Gebhardt | 198/781 |

*Primary Examiner*—Jeffrey V. Nase
*Attorney, Agent, or Firm*—Biebel, French & Nauman

[57] ABSTRACT

The live roller conveyor includes multiple power transmission devices each mounted for movement between a retracted non-driving position and a position of driving relation between a friction drive wheel therein and at least one of the rollers. Each of the power transmission devices includes an assembly wherein the drive wheel and the driving sprocket therefor are rotationally mounted, and the main drive is a flexible drive chain, the driving run of which extends through the successive power transmission devices. A chain retaining member forming a part of each of the power transmission device assemblies holds the chain in driving engagement with the associated sprocket in all moved positions of the assembly, but has a separable connection with part of the associated assembly wherein the driving sprocket is supported in order to effect release of the sprocket from the chain.

2 Claims, 7 Drawing Figures

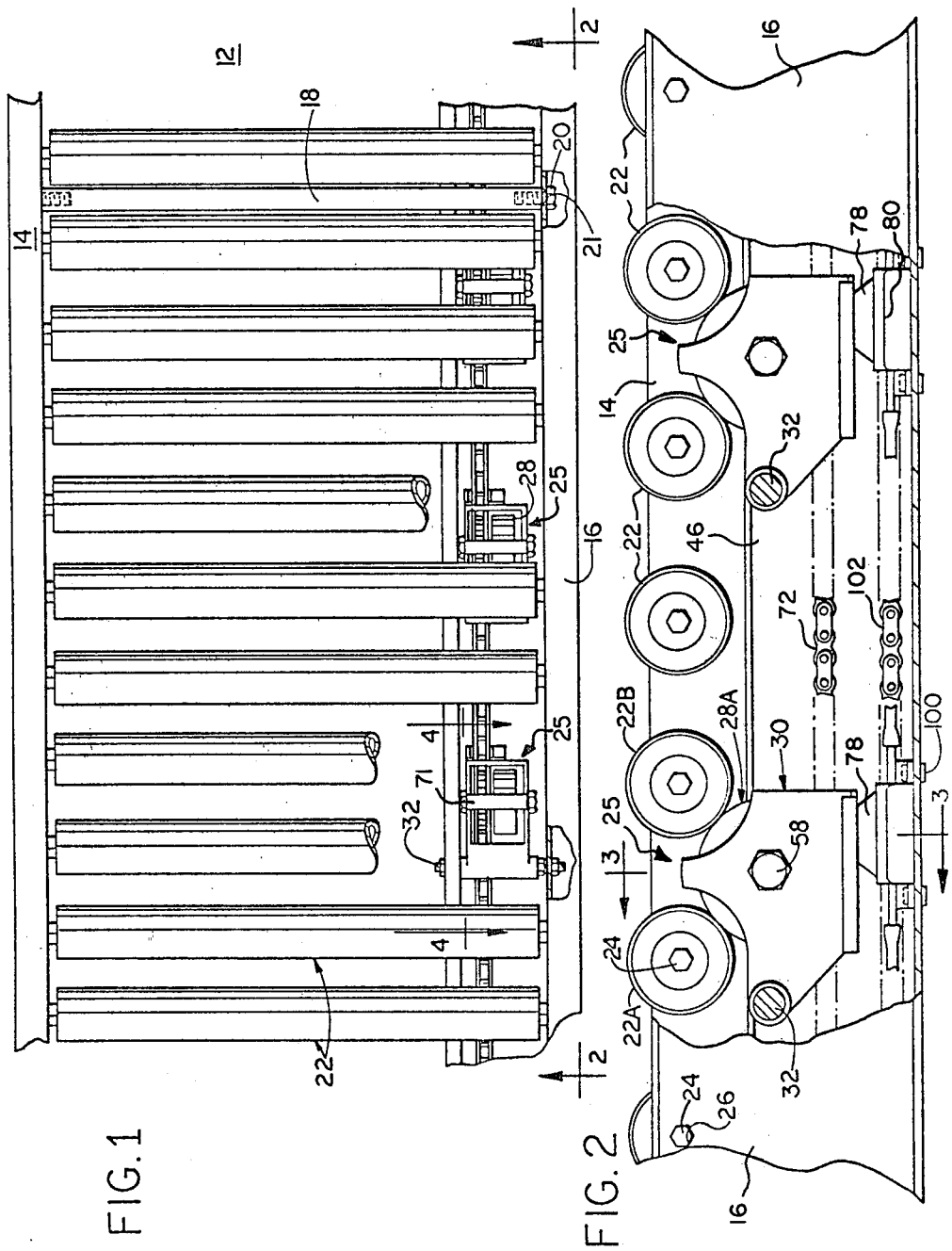

ROLLER CONVEYOR WITH FRICTION ROLL DRIVE

RELATED APPLICATIONS

This application is a continuation of application Ser. No. 914,851 filed June 12, 1978 as a continuation-in-part of application Ser. No. 710,442 filed Aug. 2, 1976 and now U.S. Pat. No. 4,108,303 issued Aug. 22, 1978.

BACKGROUND OF THE INVENTION

In known live roller accumulator conveyors prior to our above U.S. Pat. No. 4,108,303, the primary driving means for the live rollers was an endless belt, from which the drive was transmitted to selected rollers by a plurality of power transmission devices mounted for movement between a driving position and a retracted position out of driving engagement with the belt or the driven rollers. Typical such accumulator conveyors are shown in Currie U.S. Pat. No. 3,225,893 and Wallis U.S. Pat. No. 3,612,248.

It has also been suggested to construct an accumulator conveyor wherein the primary driving means comprises an endless roller chain and sprockets which form parts of the power transmission devices. Such an accumulator conveyor drive is shown in Muller U.S. Pat. No. 3,718,248, but in Muller, the guides which support the driving run of the chain are fixedly mounted in spaced relation with the several power transmission devices, and there is no provision for mounting the chain in assured driving relation with the sprocket in each power transmission device.

SUMMARY OF THE INVENTION

It is the primary purpose of the invention claimed in this application to provide a live roller conveyor wherein each of the power transmission devices for driving the live rollers is mounted for movement between a retracted non-driving position and a position of driving relation with at least one of the rollers, wherein the primary driving means for the power transmission devices is an endless drive chain and wherein each power transmission device includes an assembly comprising a sprocket, a chain guiding member normally holding the chain in guided driving engagement with the sprocket in both positions of the power transmission device, and a separable connection between the chain guiding member and the housing wherein the sprocket is supported for effecting release of the sprocket and chain from each other to facilitate servicing of any of the power transmission devices without requiring breaking of the chain.

The major feature of this invention derives from the fact that the member which holds the chain in driving engagement with the sprocket is a part of the entire power transmission device assembly which supports the sprocket and associated roller-driving wheel for movement into and out of roller-driving position, together with the fact that there is a separable connection between this chain guiding member and the portion of the assembly which retains the sprocket so that whenever it is necessary to service one of the power transmission devices, separation thereof from the chain is readily effected without breaking the chain or otherwise interfering with its driving relationship with the other power transmission devices of the conveyor.

BRIEF DESCRIPTION OF THE DRAWINGS

FIG. 1 is a plan view of a fragmentary section of a conveyor which includes a drive for article-supporting live rollers constructed in accordance with an embodiment of this invention, parts being broken away to show details of construction;

FIG. 2 is a view in side elevation looking in the direction of the arrows 2—2 in FIG. 1, parts being broken away from clarity, and the power transmission devices being shown in raised (driving) position;

DESCRIPTION OF THE PREFERRED EMBODIMENT

Figure 3:
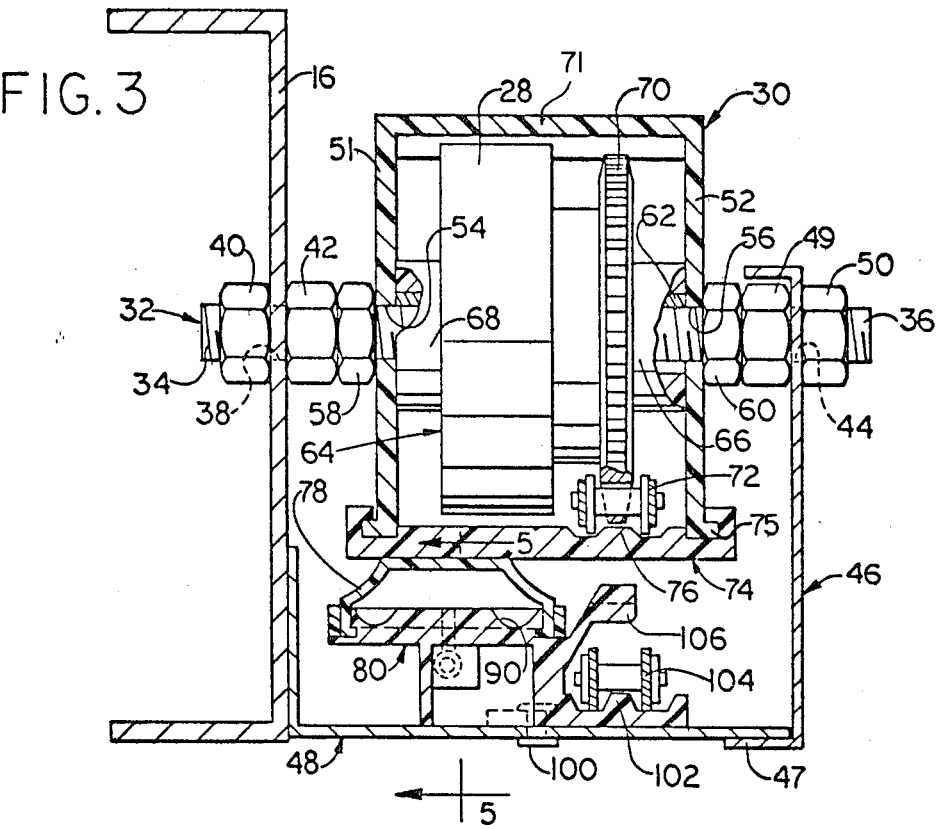
FIG. 3 is a view in section taken on the line 3—3 in FIG. 2.

FIG. 1 shows a fragmentary portion of a conveyor 12 the frame of which includes side rails 14 and 16 and appropriate supports therefor, not shown. Appropriate cross bars 18, one of which is shown in FIG. 1, hold the side rails 14 and 16 in spaced parallel relation. Fasteners 20 mounted in openings 21 in the side rails 14 and 16 are received in end portions of the cross bar 18.

Article supporting rollers 22 are rotatably mounted on cross-rods 24 of hexagonal cross section which are received in hexagonal openings 26 in the side rails 14 and 16. Selected pairs of the rollers 22 are engageable by friction drive wheels 28 in the manner that the friction wheel 28A (FIG. 2) engages the rollers 22A and 22B.

Figure 5:
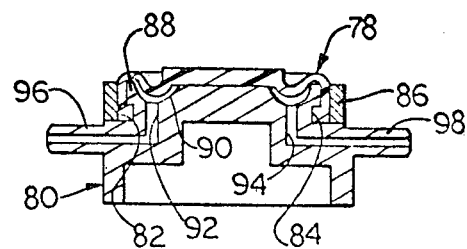
FIG. 5 is a section taken on the line 5—5 in FIG. 3.
Figure 6:
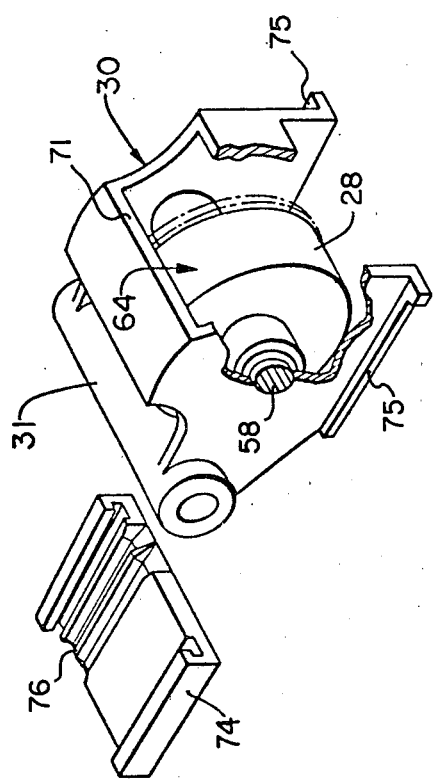
FIG. 6 is a fragmentary exploded view of the housing and an associated friction drive wheel unit of a power transmission device, parts being broken away to reveal details of structure.

Each of the drive wheels 28 is rotatably mounted in a housing 30. Details of construction of one of the housings 30 and associated members are shown in FIGS. 3, 5, and 6. The housing 30 includes a tubular portion 31 which receives a shaft member 32 having threaded end portions 34 and 36. The threaded end portion 34 extends through an opening 38 in the side rail 16. Nuts 40 and 42 mounted on the threaded end portion 34 engage opposite faces of the side rail 16.

The threaded end portion 36 of shaft member 34 extends through an opening 44 in an upright web of a channel-shaped frame and guard member 46. A lower flange 47 of the member 46 is supported on an angle-shaped frame 48 which, in turn, is supported on the side rail 16. Nuts 49 and 50 mounted on the threaded portion 36 engage opposite faces of the upright web of the member 46. The housing 30 can swing about the shaft member 32 between a raised position shown in FIGS. 2 and 3 wherein the drive wheel 28 engages a pair of rollers 22, and a lowered position shown in FIG. 4.

The housing 30 includes side walls 51 and 52 which are provided with openings 54 and 56, respectively, wherein a bearing support bolt 58 is mounted. A nut 60 threaded on the bolt 58 holds the bolt 58 in position. A bearing sleeve 62 is mounted on the bolt 58 between the side walls 50 and 52. A friction drive wheel assembly 64 is rotatably mounted on the bearing sleeve 62. The assembly 64 includes a hollow body 66 having a central portion 68 which receives the bearing sleeve 62, and a sprocket portion 70 integral with the central portion 68. The friction drive wheel 28 is a ring of rubber-like material mounted on the body 66 for engagement with associated rollers 22 as already described.

Figure 4:
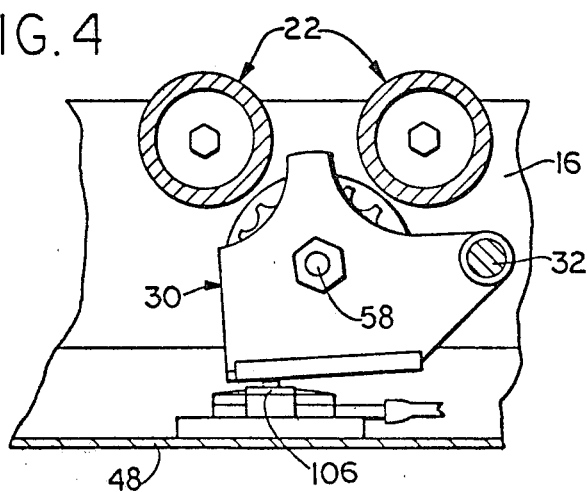
FIG. 4 is a view in section taken on the line 4—4 in FIG. 2, and showing one power transmission device in lowered non-driving position.

The housing 30 includes a top web member 71 connecting the walls 51 and 52 and of limited width to provide a cut-out on each side thereof through which the friction drive wheel 28 projects, as shown in FIG. 4, so that in the raised position of the assembly, the drive wheel can engage a pair of rollers 22. The housing 30 also carries a removable bottom plate 74, which is slidably mounted on the flanged lower edge portions 75 of the side walls 51 and 52 to provide a separable connection therebetween. A chain guide rib 76 on the bottom plate 74 underlies the sprocket portion 70 and serves to guide the upper drive chain course 72 in driving engagement with the sprocket portion 70. The bottom plate 74 can be removed to effect release of the drive chain course from the sprocket portion 70.

The housing 30 is raised about its pivot shaft 32 by a diaphragm 78 (FIGS. 3 and 5) of generally inverted cup-shape which is mounted on a molded seat 80. A peripheral flange portion 82 of the diaphragm extends into a circular slot 84 in the seat 80, and a ring 86 holds the flange wall of the diaphragm against a cylindrical boss portion 88 of the seat 80. An annular groove 90 is formed in the top of the boss 88, and as shown in FIG. 5, channels 92 and 94 in the seat 80 communicate with the groove 90. The channels 92 and 94 also communicate with the interior of coupling tube portions 96 and 98, respectively, of the seat 80.

The seat 80 is mounted on the angle-shaped frame 48 with the diaphragm 78 underlying the housing 30 by means of fasteners 100. The seat 80 is a portion of a molded plastic part 101 which also includes a chain guide portion 102 for the return chain course 104. A projection 106 on the part 101 overlies the chain guide portion 102 and underlies the housing 30, and as shown in FIG. 4, the projection 106 can serve as a stop limiting downward swinging of the housing 30.

Figure 7:
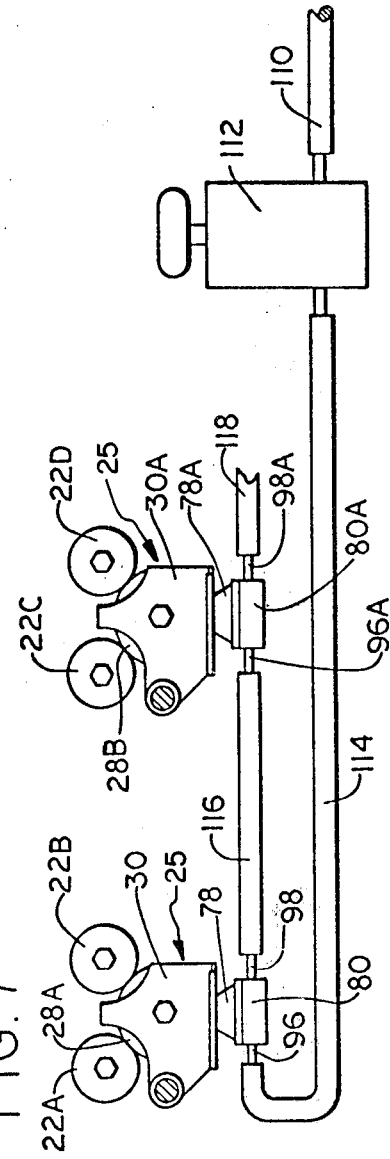
FIG. 7 is a schematic view showing pneumatic connections for a plurality of power transmission devices.

The chain courses 72 and 104 are driven by an appropriate power source, not shown, to rotate the drive wheels 28. When fluid under pressure is introduced through the coupling tube portions 96 and 98, the diaphragm 78 is expanded to raise the drive wheel 28 into driving engagement with associated rollers 22. Fluid under pressure is supplied by a line 110 (FIG. 7) connected to an appropriate source of fluid under pressure (not shown), such as an air pressure line, as shown in detail in Vogt et al U.S. Pat. No. 4,108,303. The line 110 is connected to an adjustable self-relieving pressure regulator 112, which may be of the type known as Bellofram 10B, a trademark of Bellofram Corporation.

The pressure regulator 112 supplies fluid at a selected pressure to a line 114 connected to the coupling tube portion 96 of the seat 80. A line 116 connects the coupling tube portion 98 of the seat 80 to the coupling tube portion 96A of a second seat 80. The coupling tube portion 98A of the seat 80A may be closed by a cap or connected with one or more diaphragm units as indicated at 118. The pressure regulator can be adjusted to deliver sufficient pressure to diaphragms 78 and 78A to cause housings 30 and 30A to be raised to bring the drive wheels 28A and 28B into engagement with associated article supporting live rollers 22A, 22B, 22C, and 22D to drive the live rollers. However, the pressure is preferably insufficient to cause turning of the live rollers when they are restrained, as by a package (not shown) mounted on the conveyor and restrained against forward movement.

The power transmission device described above and shown in the drawings is identical in construction with the power transmission devices disclosed in our above U.S. Pat. No. 4,108,303, wherein the live rollers are arranged in accumulator zones provided with sensor means responsive to the absence or presence of an article in each zone to actuate or deactuate the drive for the rollers in the adjacent zone upstream therefrom by controlling the supply of air to the associated diaphragm in such manner that each power transmission device moves into or out of its driving position in accordance with the absence or presence of an article in the zone immediately downstream therefrom. It is accordingly to be understood that the invention claimed herein is applicable to sensor-controlled power transmission devices as well as the pressure regulated arrangement disclosed herein.

The conveyors illustrated in the drawings and described above are subject to structural modification without departing from the spirit and scope of the appended claims.

What is claimed is:

1. A live roller conveyor of the type including a frame, a plurality of rollers mounted in said frame, and drive means for at least some of said rollers, wherein said drive means comprises a plurality of separate power transmission devices each including a supporting assembly having rotationally mounted therein a drive unit including a drive wheel and a driving sprocket therefor, means mounting said assembly on said frame for movement between a retracted non-driving position and a position of driving relation between said drive wheel and at least one of said rollers, a flexible drive chain including a driving run extending below and in driving engagement with all of said sprockets, a chain retaining member forming a part of each said movably mounted assembly in underlying relation with the associated said sprocket for retaining said chain in driving engagement with said sprocket in both of said driving and retracted positions of said assembly, and means forming a separable connection between each said chain retaining member and another part of the associated said assembly wherein said drive unit is supported to effect release of the associated said sprocket from said chain.

2. A conveyor as defined in claim 1 wherein said chain retaining member includes an upstanding rib for maintaining said chain in guided relation with the associated said sprocket.

* * * * *